(12) United States Patent
Harrison (10) Patent No.: US 9,391,540 B2
(45) Date of Patent: Jul. 12, 2016

(54) METHOD AND APPARATUS FOR CHAOTIC DEMOCRATIC PULSE WIDTH MODULATION GENERATION

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 14/178,521

(22) Filed: Feb. 12, 2014

(65) Prior Publication Data

US 2014/0226379 A1 Aug. 14, 2014

Related U.S. Application Data

(60) Provisional application No. 61/763,654, filed on Feb. 12, 2013.

(51) Int. Cl.
| | | |
|---|---|---|
| *H02M 1/00* | (2007.01) | |
| *H02M 3/156* | (2006.01) | |
| *H02M 3/158* | (2006.01) | |
| *H02J 3/38* | (2006.01) | |
| *H02M 7/5395* | (2006.01) | |
| *H02M 1/14* | (2006.01) | |
| *H02M 1/44* | (2007.01) | |
| *H02M 7/49* | (2007.01) | |

(52) U.S. Cl.
CPC .............. *H02M 7/5395* (2013.01); *H02M 1/14* (2013.01); *H02M 1/44* (2013.01); *H02M 7/49* (2013.01); *H02J 3/383* (2013.01); *H02M 3/158* (2013.01); *Y02E 10/563* (2013.01)

(58) Field of Classification Search
CPC ............. H02M 2001/0077; H02M 2001/0022; H02M 2001/0087; H02M 3/156–3/158; H02J 3/383
USPC ........................ 323/282, 285; 363/71, 97, 131
See application file for complete search history.

(56) References Cited

U.S. PATENT DOCUMENTS

| | | | |
|---|---|---|---|
| 2009/0316452 A1 | 12/2009 | Kim et al. | |
| 2010/0236612 A1* | 9/2010 | Khajehoddin et al. | ........ 136/252 |
| 2010/0265747 A1 | 10/2010 | Egiziano et al. | |

(Continued)

FOREIGN PATENT DOCUMENTS

| | | |
|---|---|---|
| JP | H-0720952 A | 1/1995 |
| KR | 20120129112 A | 11/2012 |

OTHER PUBLICATIONS

PCT International Search Report and Written Opinion for PCT/US2014/015943 Mailed on Jun. 26, 2014, 13 Pages.

*Primary Examiner* — Timothy J Dole
*Assistant Examiner* — Sisay G Tiku
(74) *Attorney, Agent, or Firm* — Moser Taboada (57) ABSTRACT

An apparatus, method and system for operating a power converter of a plurality of serially connected power converters coupled using chaotic democratic control includes: a DC voltage module generating a set current value for the power converter to bias a DC source at a set point voltage and a switching controller. The switching controller determining an upper threshold and lower threshold based on the set current value, and comparing a system current value to the upper and lower thresholds to determine an operating state of the power converter, where the system current is generated by the plurality of converters.

17 Claims, 6 Drawing Sheets

(56) References Cited

U.S. PATENT DOCUMENTS

| | | | |
|---|---|---|---|
| 2010/0283325 A1* | 11/2010 | Marcianesi et al. | 307/82 |
| 2010/0288327 A1* | 11/2010 | Lisi et al. | 136/244 |
| 2013/0155736 A1* | 6/2013 | Ilic et al. | 363/71 |
| 2014/0191582 A1* | 7/2014 | Deboy et al. | 307/82 |

* cited by examiner

METHOD AND APPARATUS FOR CHAOTIC DEMOCRATIC PULSE WIDTH MODULATION GENERATION

CROSS-REFERENCE TO RELATED APPLICATIONS

This application claims benefit of U.S. provisional patent application Ser. No. 61/763,654, filed Feb. 12, 2013, which is herein incorporated in its entirety by reference.

BACKGROUND OF THE INVENTION

1. Field of the Invention

Embodiments of the present invention generally relate to a method and apparatus for pulse width modulation generation.

2. Description of the Related Art

Distributed power systems typically comprise a power source that generates direct current (DC) power, a power converter, and a controller. The power source may be a solar panel or solar panel array, a wind turbine or a wind turbine array, a hydroelectric generator, fuel cell, and the like. The power converter converts the DC power into alternating current (AC) power, which may be coupled directly to the AC power grid. The controller monitors and controls the power sources and/or power converter to ensure that the power conversion process operates as efficiently as possible.

One type of power converter is known as a micro-inverter. Micro-inverters typically convert DC power to AC power at the power source. Thus, each power source is typically coupled to a single micro-inverter such that multiple micro-inverters provide power to the AC power grid. It is critical that the AC power generated is effectively converted to match the intended load, the AC grid. Control of the micro-inverters can grow complex with the switching transistors and consume power that could otherwise be beneficially contributed to the AC power grid as the number of power sources (and micro-inverters) increase within a large power generation array.

In addition, for higher power applications, multi-level converter topologies are applied to efficiently provide power from power sources. Multi-Level Inverters reduce the total output LC (Inductor/Capacitor) filter size by a factor of $N^2$ compared to a conventional (2 or 3 level) inverter, where N represents the number of levels.

A newer class of converter that combines the modularity of a micro-inverter with a multi-level converter has recently gained academic attention. This architecture effectively splits the output filter to be distributed over the N micro-inverters creating an even further size reduction, resulting in the size of the output LC filter becoming trivial for series-connected micro-inverters employing a system multi-level architecture. However, with this architecture, the PWM switching of the series-connected micro-inverters must be synchronized and if the micro-inverters lost the synchronization at the PWM switching frequency then the resulting system currents would destroy the switching transistors in the micro-inverters.

Therefore, there is a need in the art for a simplified distributed power coordination system without a global controller and control bus during the conversion of DC power to AC power for the power grid.

SUMMARY OF THE INVENTION

Embodiments of the present invention generally relate to a method and apparatus for chaotic democratic pulse width modulation (PWM) generation to control switching based on sampling an individual distributed generator (DG) voltage and common system current, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for controlling independent series-connected power converters to work collectively to achieve a desired control logic. A distributed control architecture is implemented in each power converter such that the power converters autonomously synchronize their switching without the need for any inter-module communications or centralized control. In one embodiment, chaotic democratic control is applied to synchronize and interleave the PWM switching of power converters serially connected on a common string. The synchronization decreases undesirable ripple voltage and electromagnetic interference (EMI) without the need for a central common controller to coordinate the switching. At each power converter, input voltage is sampled and system current is sampled from the commonly serially connected string. The voltage and current samplings are subsequently analyzed (i.e., used as control inputs) for driving the inverter switching. By using the system current as an input to switching control at each power converter, a coordinated synchronized interleaving of individual inverters is achieved without a common controller overseeing synchronization across all inverters. Embodiments herein are exemplarily discussed as comprising PV power sources coupled to serially connected power converters which use hysteresis controllers, however alternative embodiments may include varying DC power sources, converters, and controller types.

The chaotic democratic control system disclosed herein accurately synchronizes and interleaves the PWM control signals for all of the power converters in a series-connected string of power converters. Individual controllers for each power converter employ a control algorithm that is a form of "distributed Intelligence" based on a "Democratic Control" system. The system comprises all of the power converters in embodiments of the present invention implementing an identical algorithm based on a democratic control function. Since the series-connected power converters will always share the same common output system current, the common system current is used to serve the "Ballot Function" that is used by the Democratic Control scheme. In other words, each power converter casts a "ballot" and, without knowing the individual ballots from the other series-connected power converters, can determine the collective resulting system current. By knowing its own vote as well as the collective result, each power converter can determine whether it is voting higher or lower (i.e., outputting less power or more power than the average or total current) and take action to drive itself toward the average. In such a democratic voting system, any number of power converters may be employed; in addition, power converters may be added to or subtracted from the series string without impacting the control scheme. Although the PWM control signal is generated in embodiments disclosed below using a hysteretic control technique, other types of control techniques may be used such as fixed frequency continuous inductor current mode, fixed frequency dis-continuous inductor current mode, boundary conduction mode, constant on-time mode, or constant off-time mode.

Such a function allows each power converter to coordinate with other power converters without direct communication between power converters and will be discussed below in further detail with respect to the Figures discussed herein.

Figure 1:
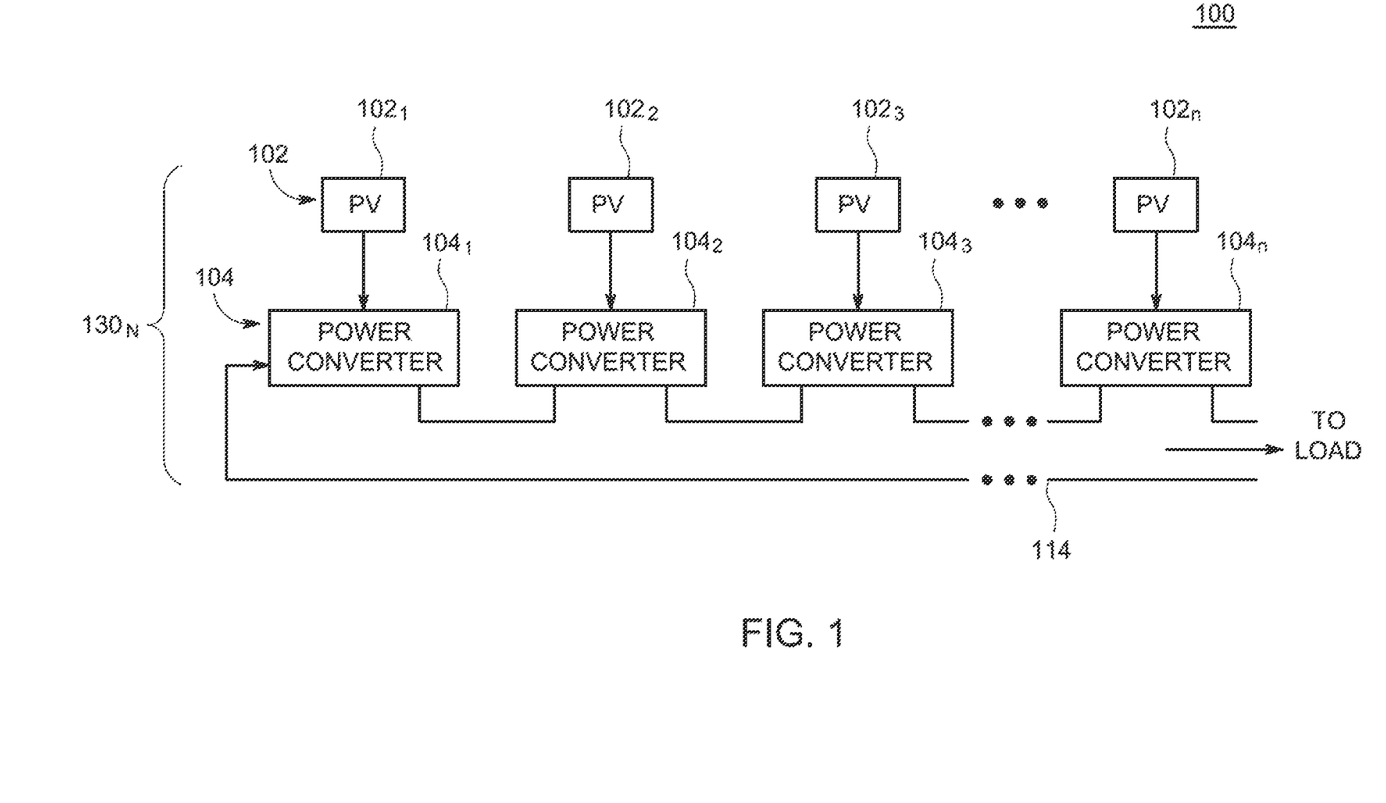
FIG. 1 is a block diagram of a serially connected power converter system in accordance with various embodiments of the invention.

FIG. 1 depicts a block diagram of a serially connected power converter system 100 in accordance with various embodiments of the invention. The system 100 comprises a plurality of power sources (e.g., photovoltaic (PV) modules) $102_1, 102_2, 102_3, \ldots, 102_n$ (collectively referred to as 102), a plurality of power converters $104_1, 104_2, 104_3, \ldots, 104_n$ (collectively referred to as 104). Each power source 102 is connected to an associated power converter 104 and a plurality of the power converters 104 are connected in series with one another via an AC bus 114 to form a "string" $130_N$. A plurality of strings $130_N$ may be coupled in parallel to form an array of strings.

The system multi-level architecture in system 100 requires the series-connected power converters to be not only synchronized at the mains frequency but also to be synchronized (and all accurately interleaved) at their switching frequency. Each power converter $104_1$ corresponding to a string $130_N$ and PV module $102_1$ executes logic according to a control algorithm that will be further described below in FIGS. 2-6 for synchronizing and interleaving the power converters 104 sharing the same string. For example, the switching for the power converter $104_1$ will be synchronized and equally interleaved using a control algorithm, at each converter 104 based on the voltage on a corresponding PV $102_1$ and the string current on bus 114. An exemplary power converter 104 and associated logic will be discussed below with respect to FIGS. 2 and 3.

As described below, each power converter $104_N$ implements a hysteretic control technique such that the power converters within a particular string operate in synchronization and interleaved. A close inspection of a single power converter 104 PWM signal reveals a signal that is highly regular with a constant duty cycle and frequency. However, the PWM signal may have an occasional random anomaly that affects only one single switching cycle (e.g., a "runt" or "titan" cycle). This occasional anomaly accommodates for the system level differences in the PWM switching frequency. Inspection of the PWM signals of all the power converters in the system 100 reveals that the seemingly chaotic and random PWM signals manage to always remain interleaved without the use of high speed communication or control buses. Furthermore, the aforementioned system 100 may, in certain embodiments, require only the inductance afforded by the AC system wiring to serve the function of the inverter output filter. Additional embodiments include systems larger in size with multiple strings (e.g., 2, 3, 4, strings and the like).

Figure 2:
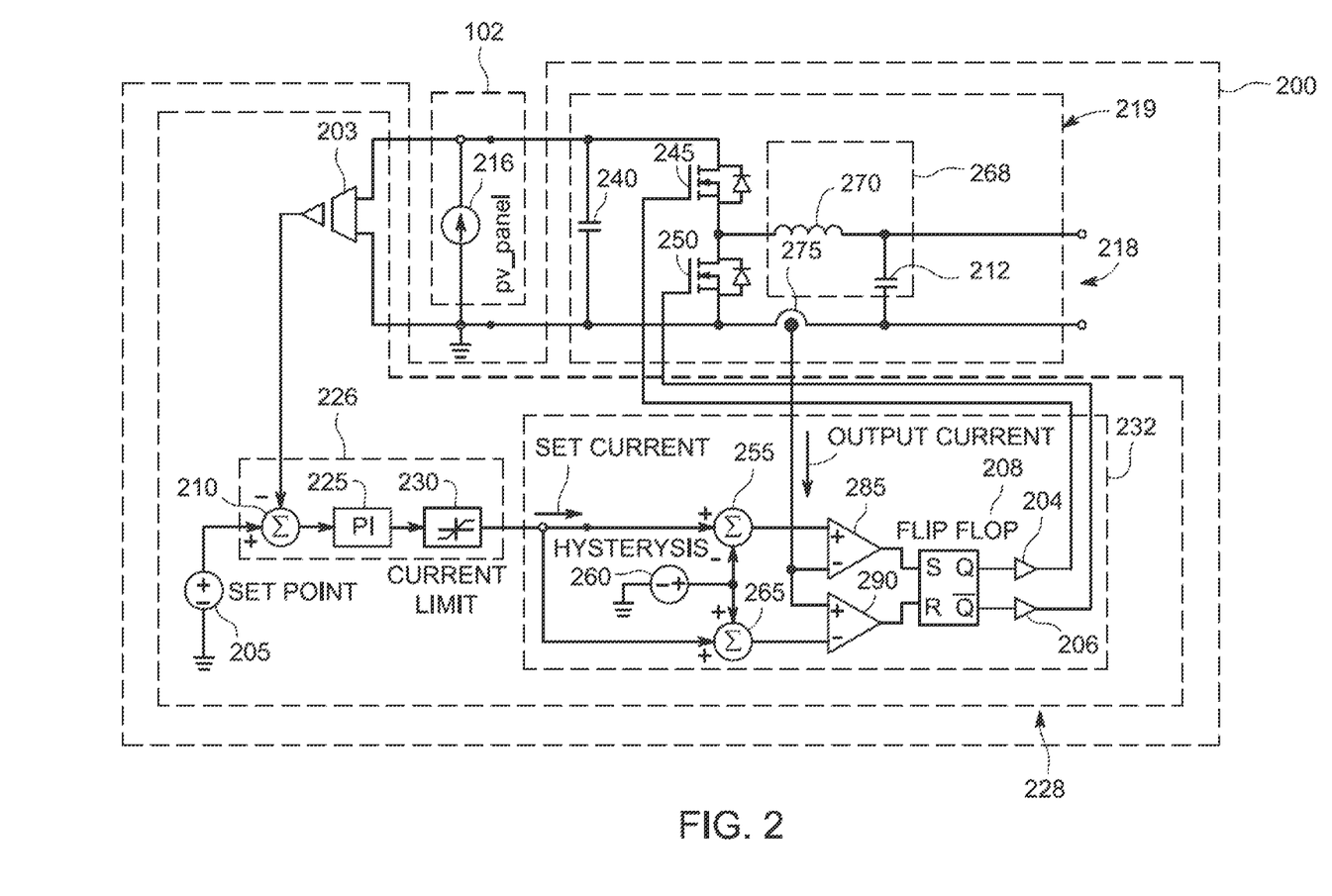
FIG. 2 is a functional block diagram of a power converter implementing chaotic democratic pulse width modulation in accordance with one or more embodiments of the present invention.

FIG. 2 is a functional block diagram of a power converter 200 implementing chaotic democratic pulse width modulation in accordance with one or more embodiments of the present invention. The power converter 200 is coupled across its input to an exemplary DC power source, such as a PV module 102 (represented by a current source 216), and comprises a power converter circuit 219 and a control circuit 228. In the embodiment shown, the PV module 102 creates DC that is converted into a two-level output current that is switched from one level to another using switching signals produced by the control circuit 228.

The power converter circuit 219 comprises a first capacitor 240, a first switch 245 serially coupled to a second switch 250, a LC circuit 268, and a current sensor 275. The first capacitor 240 is coupled across the power source 216 and across the first switch 245 and second switch 250. The LC circuit 268 comprises an inductor 270 and a second capacitor 212. In one embodiment, the inductor 270 may be in the nanohenry or microhenry range while the second capacitor 212 may be in the microfarad range. In some embodiments, the wiring inductance provides sufficient inductance and a separate inductor is not required. A first end of the inductor 270 is connected between (e.g., to the source and drain of) the switches 245 and 250. A second end of the inductor 270 is coupled to a first end of the second capacitor 212 and a first end of an output port 218. A second end of the second capacitor 212 is coupled to an end of the first capacitor 240, switch 250, current sensor 275, and a second end of the output port 218.

The first capacitor 240 filters the voltage from the power source 216 and the switches 245 and 250 chopping the DC voltage using PWM. The power is then applied to the LC circuit 268 prior to coupling to the output port 218. In some embodiments, a voltage sensor (not shown) is coupled across the output port 218 of the power converter circuit 219.

A voltage sensor 203 is coupled to the PV module 102. In some embodiments, the voltage sensor 203 samples the voltage across the PV module 102. In other embodiments, the voltage sensor 203 samples the voltage across the input of the power converter (e.g., across the first capacitor 240). The current sensor 275 measures an output current value $I_{out}$. The output current $I_{out}$ is representative of the current on the string $130_1$ (i.e., the system output current for the series-connected string of power converters 104).

Current and voltage measurements from the current sensor 275 and voltage sensor 203 are provided to the control circuit 228. The control circuit 228 includes a DC voltage controller 226, and PWM switching controller 232. In some embodiments, the control circuit 228 is a hysteretic controller, although other embodiments may use different types of controllers.

The PV module 102 is connected to the input voltage sensor 203 and to the DC voltage controller 226. The voltage sensor 203 sends a voltage measurement to the summer 210. The summer 210 is further coupled to a set point voltage 205 to output a difference value. The set point voltage 205 is the desired bias across the PV module 102 such as a calculated maximum power point (MPP) voltage as determined by a maximum power point tracking (MPPT) algorithm. In some embodiments, the MPPT algorithm may be calculated by an MPPT controller (not shown).

A control voltage error signal (difference between the sensed voltage and the set point voltage) is coupled to a proportional integrator (PI) controller 225 and the PI controller output is coupled to a current limiter 230. The current limiter 230 outputs a set current comprising a required current value $I_{req}$ based on the desired MPP voltage to the input of two summers 255 and 265. An offset hysteresis value is added (e.g., by summer 265) and subtracted (e.g., by summer 255) from the hysteresis-source 260. The hysteresis value is chosen according to the amount of current ripple that can be tolerated by the power conversion block (219). The summers 255 and 265 respectively output to a first comparator 285 and a second comparator 290 that are each coupled to the current sensor 275 of the power converter circuit 219. The current sensor 275 couples the output current value $I_{out}$ to the inverting input of comparator 285 and to the non-inverting input of comparator 290. The output from summer 255 is coupled to the non-inverting input of comparator 285, while the output from summer 265 is coupled to the inverting input of comparator 290.

The summers 255 and 265 and hysteresis source 260 create a hysteretic threshold for the comparators 285 and 290 to compare with the output current from the current sensor 275. The output of the comparators 285 and 290 are coupled respectively to the inputs of an S-R flip-flop 208. The outputs of the S-R flip-flop 208 are connected to a first gate driver 204 and second gate driver 206. The first gate driver 204 and second gate driver 206 send control signals to switches 245 and 250.

The S-R flip-flop 208 creates pulse width modulated signals to control the switching of switches 245 and 250. By using a hysteretic threshold(s), the S-R flip-flop 208 will set and reset at different levels of measured current depending if the current is increasing or decreasing as compared to the control voltage error signal output from the DC voltage controller 226.

In view of Kirchoff's current law (i.e., that the output current must be the same for each series-connected power converter), the switching of one power converter $104_1$ affects the current in the remaining power converters $104_{n-1}$ and thus the circuit control may be used to impact the switching in all other power converters in the string $130_1$. Thus, the comparison of the outputs from summers 255 and 265 with that of current $I_{out}$ are each input to a SR flip-flop 208 for hysteretic control. Such hysteretic control is instrumental in the chaotic democratic control system as the probability of switching a given power converter 104 is directly related to the voltage across the power converter (e.g., on capacitor 240) and the current $I_{out}$ that is a shared current among all power converters 104 on the same string (e.g., string $130_1$).

Switches 245 and 250 are PWM driven based on two states, an "ON" state and an "OFF" state). The Set current value of $I_{req}$ increases or decreases the set level of current that is compared to the actual output current of the power converter 104. The comparison is used to either "Set" the PWM S-R flip-flop 208 into the ON state (i.e., switch 245 is conducting and switch 250 is not conducting) or "Reset" the PWM SR flip-flop 208 into the OFF state (i.e., switch 250 is conducting and switch 245 is not conducting). The S-R flip-flop 208 may also generate an output for holding switches 245 and 250 in their current state. When a power converter is in an OFF state, the first capacitor 240 is charged by the PV module 102 and the voltage on the first capacitor 240 rises (i.e., charges). As the capacitor voltage rises, the probability of switching to the ON state increases. When the converter switches to the ON state, the energy from the capacitor is rushes into the system 100 such that substantially instantaneously, the probability for every other power converter in the string switching from an OFF state to an ON state is reduced by 1/N where N is the total number of power converters in the string.

When a power converter is in an ON state, the charge on the input capacitor flows through switch 245 and the voltage on the capacitor falls (i.e., discharges). As the capacitor discharges, the probability of switching from an ON state to an OFF state increases. When the unit switches to an OFF state, substantially instantaneously, the probability for every other unit of switching from an ON state to an OFF state is reduced by 1/N.

The control circuit 228 may be implemented in hardware, software, or firmware such as through a microcontroller or application specific integrated circuit (ASIC). Alternative further embodiments may have an H-bridge inverter in place of switches 245 and 250 to provide an AC output that operate in three states (3-level)—ON(+Ve), ON(−Ve), and OFF. The logic for determining if the positive (+Ve) or negative (−Ve) ON state should be used is based simply on the instantaneous polarity of the mains voltage of the desired load (e.g., commercial AC grid).

The behavior of the aforementioned algorithm for control can be described using the following four probability statements across a shared string (e.g., $130_1$):

1. The probability of the PWM flip-flop 208 changing from the OFF state to the ON state increases according to the increasing time-voltage integral of the control error signal (i.e., the difference between the control set point voltage 205 and the actual capacitor 240 voltage) that results during the OFF state.
2. When the PWM flip-flop 208 changes from the OFF state to the ON state then the common system output current will ramp up and this in turn will reduce the probability of all the other power converter PWM flip-flops from changing from their OFF to the ON state by a factor of 1/N and also increase the probability of all the other power converters PWM flip-flops (not shown) from changing from their ON to the OFF state by a factor of 1/N. Where N is the total number of power converters 104 on a given string (e.g., $130_1$).
3. The probability of the PWM flip-flop 208 changing from the ON state to the OFF state increases according to the decreasing time-voltage integral of the control error signal (i.e., the difference between the control set point voltage 205 and the actual capacitor 240 voltage) that results during the OFF state.
4. When the PWM flip-flop 208 changes from the ON state to the OFF state then the common system output current will ramp down and this in turn will increase the probability of all the other power converter PWM flip-flops from changing from their OFF to the ON state by a factor of 1/N and also decrease the probability of all the other power converter PWM flip-flops (not shown) from changing from their ON to the OFF state by a factor of 1/N.

The combination of the aforementioned four probability statements results in chaotic random system based on a ballot system resulting from the following exemplary state table for the PWM flip-flop 208.

| State | S | R | Q | Operation Threshold |
|---|---|---|---|---|
| First State | 0 | 0 | Q (hold) | $I_{req}^* < I_{out} < I_{req}^{**}$ |
| Second State | 0 | 1 | 0 (reset) | $I_{req}^* < I_{out}, I_{req}^{**} < I_{out}$ |
| Third State | 1 | 0 | 1 (set) | $I_{req}^* > I_{out}, I_{req}^{**} > I_{out}$ |
| N/A | 1 | 1 | — | $I_{req}^* > I_{out}, I_{out} > I_{req}^{**}$ |

The table represents the operational threshold for various output current values and results when passed through the comparators 285 and 290 and the PWM flip-flop 208. From the table, it can be seen the PWM flip-flop 208 operates in essentially three states where h is the hysteresis value, $I^*_{req} = I_{req} - h$, and $I^{**}_{req} = I_{req} + h$.

The first state is a holding value where the output current $I_{out}$ is between the two hysteresis values of $I^*_{req}$ and $I^{}_{req}$ and maintains switches 245 and 250 at the previous switching state. The second state is a reset state where above an upper threshold (e.g., the value output by summer 265, $I^{}_{req}$), the PWM flip-flop 208 is reset and the power converter circuit 219 is in an "OFF" position. An OFF position is a state where switch 245 is opened and switch 250 is closed. The third state is a set state wherein below a lower threshold (e.g., the value output by summer 255, $I^*_{req}$), the PWM flip-flop is set and the power converter circuit 219 is in an "ON" position. An ON position is a state where switch 245 is closed and switch 250 is opened to supply power to the output port 218. The last state where the output current $I_{out}$ extends beyond two thresholds is not possible is shown for completeness of the table and is effectively ignored by the power converter 104.

Figure 3:
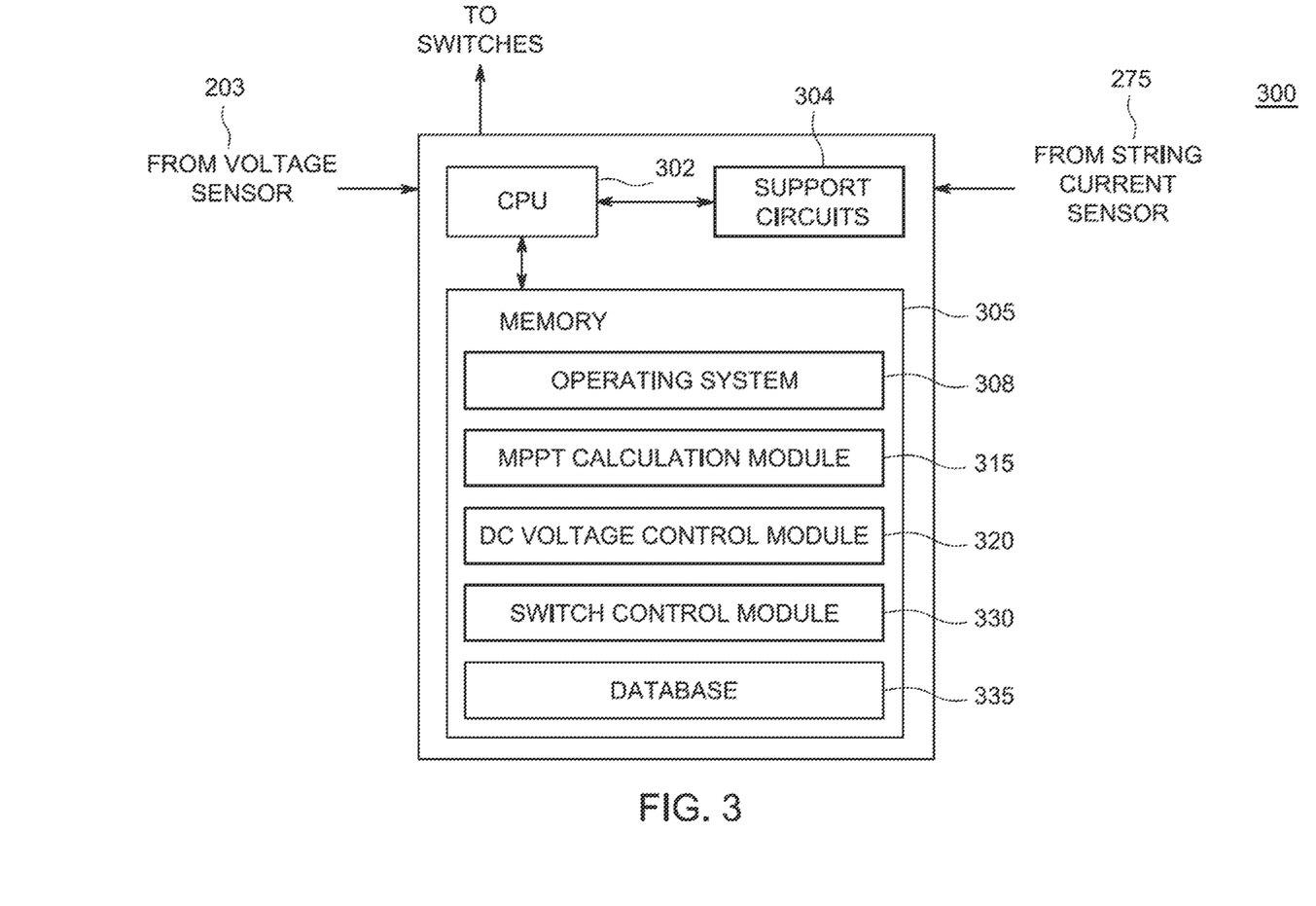
FIG. 3 is an exemplary block diagram of a controller for implementing the chaotic democratic pulse width modulation in accordance with one or more embodiments of the present invention.

FIG. 3 is an exemplary block diagram of a controller 300 for implementing the chaotic democratic pulse width modulation in accordance with one or more embodiments of the present invention. In some embodiments, the controller 300 is used as the control circuit 228. The controller 300 is coupled to the voltage sensor 203 and current sensor 275 for sampling voltage input to the power converter 104 and output current $I_{out}$ on the AC bus 114. In some embodiments, the voltage sensor 203 and current sensor 275 include analog to digital (A/D) conversion circuitry to send digital data to the controller 300. In other embodiments, the controller 300 may include the N/D conversion circuitry.

The controller 300 comprises a central processing unit (CPU) 302 coupled to each of support circuits 304 and memory 305. The CPU 302 may be any commercially available processor, microprocessor, microcontroller, and the like. The support circuits 604 comprise well known circuits that provide functionality to the CPU 302 such as clock circuits, cache, power supplies, I/O circuits, and the like.

The memory 305 may be any form of digital storage used for storing data and executable software. Such memory includes, but is not limited to, random access memory, read only memory, disk storage, optical storage, and the like. The memory 305 stores computer readable instructions corresponding to: a MPPT calculation module 315, a DC voltage control module 320, and switch control module 330. Additionally, the memory 305 may store an operating system 308 and one or more databases 335 for storing data, for example, related to the present invention.

The MPPT calculation module 315 calculates the set point voltage 205 desired for a given PV module 102. In alternative embodiments, the set point voltage 205 may be a different predetermined value to ensure maximum efficient generation from a DC input type other than a PV module.

The DC voltage control module 320 calculates the difference between the set point voltage 205 and the voltage from the voltage sensor 203. Based on the resulting control error signal, the Dc voltage control module 320 determines (e.g., using proportional integral control) a set current value for biasing the PV module at the desired set point voltage. The DC voltage controller 226 is one implementation of the DC voltage control module 320.

The switch control module 330 determines an upper and lower threshold by added and subtracting a hysteresis value "h" to the determined set current value (e.g., $I_{req}$). The switch control module 330 then compares the current output from the power converter (i.e., the system output current) to the upper and lower threshold for generating the appropriate PWM switching signals as previously discussed. The PWM switching controller 232 is one implementation of the switching control module 330.

Figure 4:
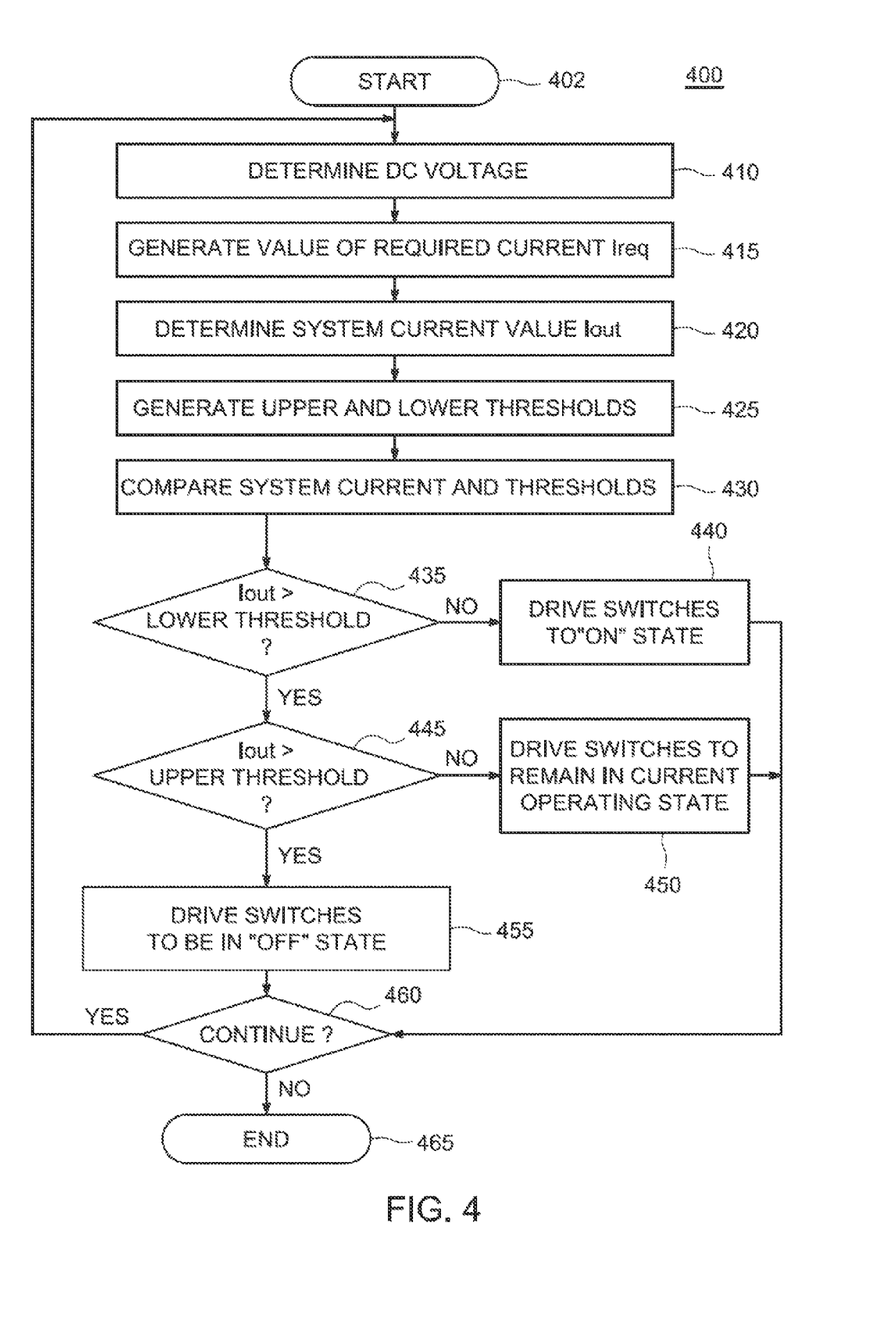
FIG. 4 is a method for chaotic democratic control of a power converter in accordance with one or more embodiments of the present invention.

In some embodiments, such as the embodiment described below, a plurality of power converters are coupled to a plurality of PV modules in a one-to-one correspondence and convert the DC power from the PV modules to an output power. In other embodiments, other types of DC sources may be used. The plurality of power converters 104 are serially-connected to generate a common system output current $I_{out}$. Each power converter (e.g., the power converter 104) employs a control technique (described below in the method 400) such that the switching for the power converters is synchronized and interleaved without the need for any inter-module communication or centralized control. In some embodiments, the power converters may be DC-DC converters; in other embodiments they may be DC-AC inverters.

FIG. 4 is a method 400 for chaotic democratic control of a power converter in accordance with one or more embodiments of the present invention. The method 400 may be executed by the controller 300 or the control circuit 228 as previously described. Alternative embodiments include changing the order of the steps to affect the 1/N probability of switching states equally distributed among the N power converters coupled in a series string to change between the three operating states.

The method 400 begins at step 405 and continues to step 410 to determine the DC voltage of the DC power source (e.g., PV module $102_1$). Next, at step 415, the value of the required current required current $I_{req}$ is generated. The value may be based on an MPPT algorithm for biasing the PV module $102_1$ at its maximum power point. In alternative embodiments, the required current $I_{req}$ value may be calculated based on the desired bias for the type of DC power source (e.g., wind turbine, thermocouple and the like) coupled to the power converter. The required current $I_{req}$ is generated based on a difference between the desired voltage bias for the corresponding PV module and the actual voltage bias of the PV module (i.e., the control error signal), as previously described. The calculation may be performed using a proportional integrator function and the voltage bias may be measured across the input capacitor (e.g., capacitor 240) of the power converter.

Next at step 420, a current value $I_{out}$ is determined on the bus (e.g., bus line 114) shared by the serially connected power converters. In some embodiments, the current value $I_{out}$ is measured by a current detector. In other embodiments, the current output is calculated based on a measured input current to the converter.

At step 425, an upper and lower threshold is generated. In a control system using hysteresis, the upper threshold is calculated by adding a hysteretic value h to $I_{req}$. Similarly, the lower threshold is calculated by subtracting the hysteretic value h from $I_{req}$. Alternatives to hysteric control include other types of control techniques that may be used such as fixed frequency continuous inductor current mode, fixed frequency dis-continuous inductor current mode, boundary conduction mode, constant on-time mode, or constant off-time mode.

Then at step 430, a comparison is made between the thresholds and $I_{out}$ value. The comparison is used to directly determine the switching state of the associated power converter. The comparison indirectly affects the probability of all other power converters (e.g., $104_{N-1}$) in the series string (e.g., $130_1$) switching to a matching state by a factor of 1/N. For example, when a power converter switches from the OFF to ON state, the resulting inrush increase in the system current $I_{out}$ increases the probability all other power converters should switch to or maintain the OFF state. In addition, a decrease in the system current $I_{out}$ increases the probability a power converter should switch from OFF to ON.

At step 435, the method 400 determines whether the system current $I_{out}$ value is greater than the lower threshold (i.e., $I_{req-h}$). If determined the $I_{out}$ value is not greater, the method 400 proceeds to step 440. At step 440 the power converter is to change to a third state or an otherwise "ON" state using PWM control signals. In other embodiments, other types of control signals may be used for controlling the power converter switches. At step 440, switches operating in an "ON" state (i.e. switch 245 is conducting and switch 250 is not conducting) remain in such positions. However, switches operating in an "OFF" state (i.e. switch 250 is conducting and switch 245 is not conducting) are driven to an "ON" state. The method 400 then continues to step 460. If however, it is determined at step 435 the $I_{out}$ value is greater than the lower threshold, the method 400 proceeds to step 445.

At step 445, the method 400 determines whether the system current $I_{out}$ value is greater than the upper threshold (i.e., $I_{req+h}$). If determined the system current $I_{out}$ value is not greater, the method 400 proceeds to step 450. At step 450, the power converter is instructed to a first state and holds the current switch state regardless if the previous state is ON or OFF. For example, if the previous state is in the ON state, switches 245 and 250 are driven to remain in the ON state. If the previous state is in the OFF state, switches 245 and 250 are driven to remain in the OFF state. If however, it is determined at step 445 the $I_{out}$ value is greater than the upper threshold, the method 400 proceeds to step 455.

At step 455, the power converter is instructed to change to a second state or an otherwise OFF state. In other words, when switches 245 and 250 are in the OFF state, PWM control signals drive the switches to remain in an OFF state. However, at step 455, if switches 245 and 250 are in the ON state, the switches are PWM driven to an OFF state. The method 400 then continues to step 460.

At step 460, the method 400 determines whether the method 400 should continue the democratic control. The method 400 proceeds back to step 410 if determined to continue. If however, the method 400 determines operation should be discontinued (e.g., external instruction, detected improper interleaving, imbalance, and the like) the method 400 ends at step 465.

Each power converter 104 generates switching control signals using the hysteretic control technique in method 400. The power converters are then operating independently of one another but also are collectively orchestrated to achieve synchronized and interleaved switching. The hysteretic control signal as described above is based on a DC source set point voltage and further influenced by the common system current. By maintaining the DC source at a desired set point, the determined system current influences the actual timing of switches in the power converters 104 and hence interleaves the converters. While the power converters may operate at slightly different frequencies from one another, at the system level, they are driven towards being interleaved.

Figure 5:
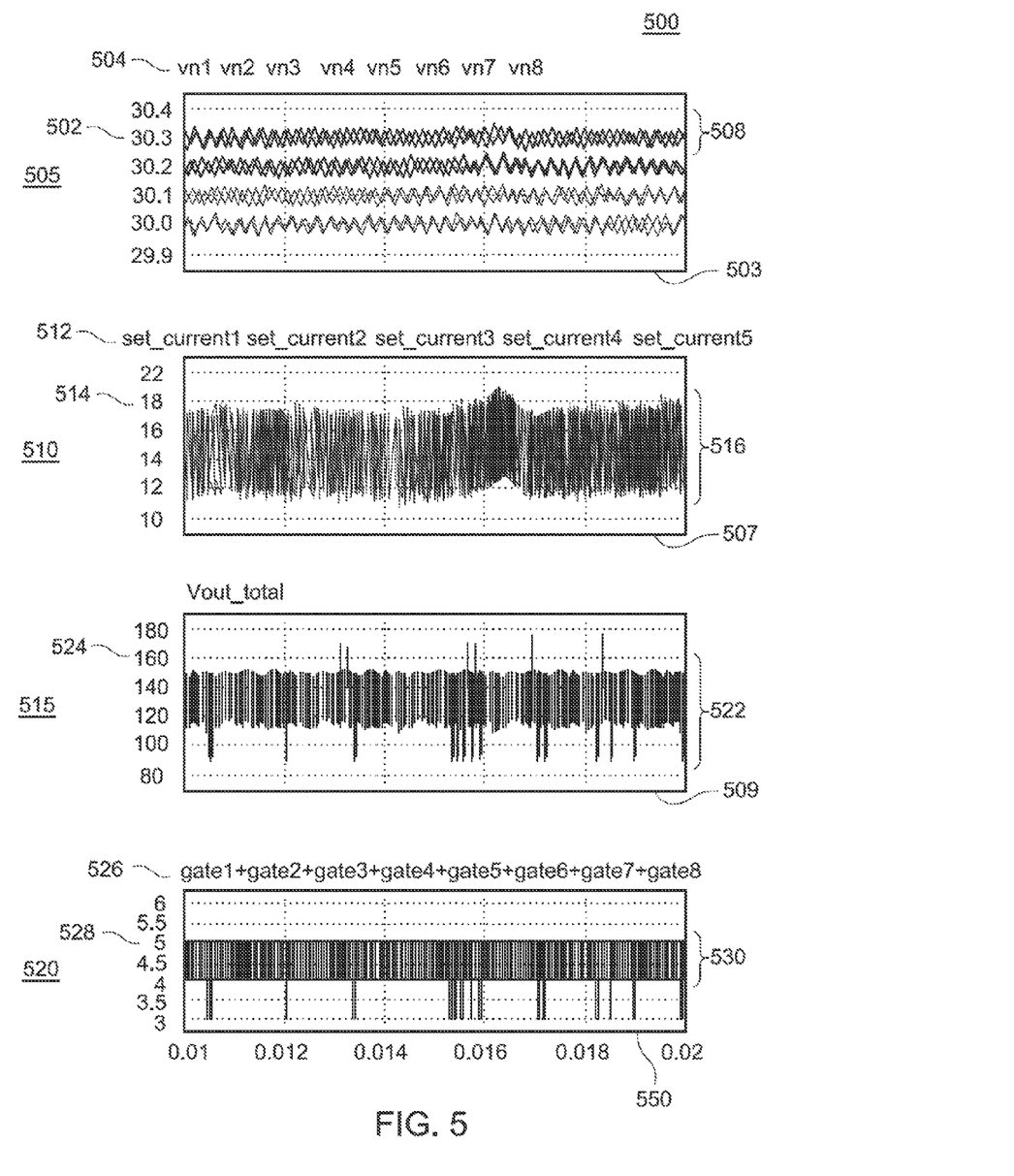
FIG. 5 is a series of graphs depicting an exemplary output results from simulating the chaotic democratic control across an exemplary eight power converters in accordance with one or more embodiments of the present invention.

FIG. 5 is a series of graphs 500 depicting an exemplary output results from simulating the chaotic democratic control across an exemplary eight power converters in accordance with one or more embodiments of the present invention. The graphs 500 comprise individual graphs 505, 510, 515, and 520. The first graph 505 depicts the various input voltages 504 to the exemplary eight power converters (Vin1 to Vin8) plotted on set point voltage 502 versus time 503. The second graph 510 depicts set currents 512 for the converters plotted on current 514 versus time 507. The third graph 515 depicts the output current 522 plotted as current 524 versus time 509. The fourth graph 520 depicts the logic driving signals 526 that control the switches in the converter plotted as the number of converters 528 versus time 550.

The graphs 500 plot a value corresponding to a voltage (502, 524), current 512, or number of power converters (e.g., power converter 104) 528 over time 550 (in seconds) resulting from a simulation of the circuits described above sharing a common serial bus string.

The first graph 505 depicts the various input voltages 504 to the exemplary eight power converters (Vin1 to Vin8) on a plot of set point voltage 502 versus time 550. In such an exemplary embodiment, there are set point voltages 502 in increments of 0.1V (however, other increments may be realized). The largest pair of inverter inputs 508 (in this example is Vin7 and Vin8) has a set point voltage 502 of 30.3V and is observed as a sawtooth waveform that oscillates above and below the exact Set point voltage 502 as a result of hysteretic control with roughly the same voltage. In this example, Vin1 and Vin2 have a set point voltage 502 of about 30V, Vin3 and Vin4 of about 30.1V, and Vin5 and Vin6 of about 30.2V. The randomness of the waveforms exhibit a "chaotic" behavior as depicted by the differences between the pairs of converter inputs 504 that share the same set point voltage 502.

The second graph 510 of the graph 500 depicts current 512 for the eight exemplary power converter control loops (e.g., $I_{req}$) as current 514 versus time 550. Specifically, the output of the voltage error amplifier compares the actual individual converter input voltage with the specific Set point voltage 502 for that particular power converter. The "set current" 516 (e.g., output of DC voltage controller 226) are used as the "set current" input for the hysteretic control scheme.

Note that in this example, although the pairs of power converters have different set point values (4 different values in this example) all of these waveforms oscillate around the exact same current of approximately 15 amps. As mentioned above, the common system current of serially connected power converters is used as part of the "ballot process" for the democratic control. In other words, all series-connected power converters end up sharing the same system current but based on the differences in the set point values for the controller voltages, the power converters are actually supplying differing amounts of power (in direct proportion to their individual voltage set points).

The third graph 515 is a plot of current 524 against time 550 that depicts the combined total output voltage 522 from the eight exemplary power converters. On average, the voltage is approximately 120V, but switching transients can go up as high as 180V and also occasional as low as 90V. Each power converter can either add approximately 30V to a combined "voltage stack" if it is in the "on" state or contribute zero if in "off" state. The contribution manifests as discrete voltage levels, however the average total system voltage as a result of such individual converter control, remains in the vicinity of just over 120V.

The fourth graph 520 is a graph of number of power converters 528 against time 550 to plot the number of power converters in a particular state by the sum of the eight gate driver logic signals 526 with a value of 1 being equivalent to a power converter being in its "ON" state and a value of 0 being equivalent to the power converter being in its "OFF" state. The values of the signals 530 spend most of the time oscillating between 4 and 5 with occasional excursions as low as 3 and as high as 6 out of the 8 total power converters. The y-axis values 528 of the forth portion 520 represents the number of power converters that are currently in the "on" state. For example, if the value is 4 then this represents 4 of the 8 total power converters will be in the "ON" state for a particular instance of time. When viewed in conjunction with the third portion 515, it is clear from the forth portion 520 that on average there needs to be 4 or 5 of the power converters in the "ON" states to regulate the total system voltage to the required value (approximately 120V in this example) to drive the correct system current. As mention above with method 400, the probability of changing an individual converter operation state is determined by the aforementioned ballot process in the chaotic democratic system.

Figure 6:
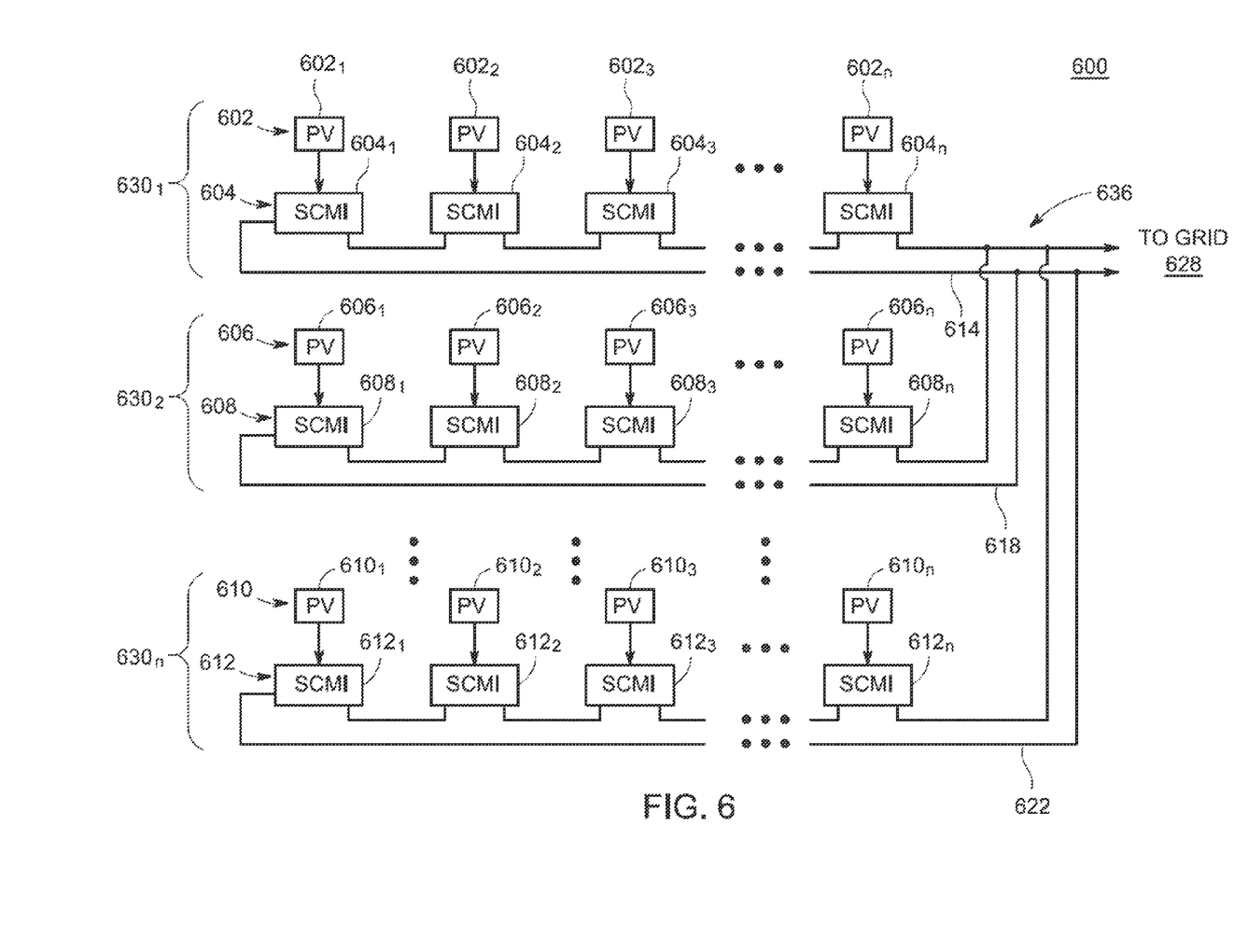
FIG. 6 is a block diagram of a serially connected micro-inverter (SCMI) system in accordance with various embodiments of the invention.

FIG. 6 is a block diagram of a serially connected micro-inverter (SCMI) system 600 in accordance with various embodiments of the invention. The system 600 comprises a plurality of power sources (e.g., photovoltaic (PV) modules) $602_1, 602_2, \ldots, 602_3, 602_n$ (collectively referred to as 602), and a plurality of serially-connected micro-inverters (SCMI) $604_1, 604_2, 604_3, \ldots, 604_n$ (collectively referred to as 604). Each SCMI comprises the power converter 104 discussed above with respect to FIGS. 1-5 in addition to DC-AC conversion circuitry for outputting AC power to an AC grid 628. Each power source 602 is connected to an associated SCMI 604 and a plurality of the SCMIs 604 are connected in series with one another via an AC bus 614 to form a "string" $630_1$. A plurality of strings $630_1, 630_2, 630_m$ may be coupled in parallel to form an array of strings. String $630_2$ comprises power sources 606, SCMI 608, and an AC bus 618, while string $630_m$ comprises power sources 610, SCMI 612, and an AC bus 622. The voltage at the end of each string is generally equal to the AC grid voltage.

The system multi-Level architecture in system 600 requires the series connected micro-inverters to be not only synchronized at the mains frequency but also to be synchronized (and all accurately interleaved) at their switching frequency. Each SCMI (604, 608, and 612) corresponding to a string ($630_1$, $630_2$, and $630_m$) and PV module (602, 606, and 610) executes logic according to a control algorithm for interleaving the SCMI sharing the same string. For example, SCMI $604_1$ will be equally interleaved using a statistical analysis of the switching states of the remaining SCMI $604_{n-1}$ in string $630_1$ based on the voltage on PV $602_1$ and the string current on bus 614.

Each SCMI $604_N$ operates in synchronization and interleaved by measuring the input DC input voltage from a respective PV module $602_N$ and the common string current (e.g., on bus 614). As mentioned above, the measurements affect the probability of operations for other SCMIs in the string $630_1$ for each time period for interleaving the SCMIs. Thus, the SCMIs employ a synchronized and interleaved PWM control scheme that mimics a multi-level power converter at the system level.

While the foregoing is directed to embodiments of the present invention, other and further embodiments of the invention may be devised without departing from the basic scope thereof, and the scope thereof is determined by the claims that follow.

The invention claimed is:

1. An apparatus for operating a power converter of a plurality of serially connected power converters coupled using chaotic democratic control comprising:
    a DC voltage module for generating a set current value for the power converter to bias a DC source at a set point voltage; and
    a switching controller for determining an upper threshold and lower threshold based on the set current value, and comparing a system current value to the upper and lower thresholds to determine an operating state of the power converter, where the system current is generated by the plurality of serially connected power converters, wherein when comparing the system current value indicates the system current value is less than the lower threshold, a control signal drives the power converter to switch from the off-state to the on-state; and wherein switching from the off-state to the on-state causes for each remaining power converter of the plurality of power converters operating in the off-state, a decreased probability of switching from the off-state to the on-state.

2. The apparatus of claim 1, wherein generating the set current value further comprises comparing a measured DC voltage and a set point voltage value and generating a control error signal based on a difference between the measured DC voltage and the set point voltage value.

3. The apparatus of 1, wherein when comparing the system current value indicates the system current value exceeds the upper threshold, the control signal drives the power converter to switch from the on-state to the off-state; and wherein switching from the on-state to the off-state causes for each remaining power converter of the plurality of power converters operating in the on-state, a decreased probability of switching from the on-state to the off-state.

4. A system for chaotic democratic control comprising:
    a plurality of micro-inverters coupled to a plurality of photovoltaic (PV) modules in a one-to-one correspondence, where each micro-inverter of the plurality of micro-inverters comprises:
        a DC voltage module generating a set current value for a micro-inverter of the plurality of micro-inverters to bias a PV module of the plurality of PV modules at a set point voltage; and
        a switching controller determining an upper threshold and a lower threshold based on the set current value, and comparing a system current value to the upper and lower thresholds to determine an operating state of the micro-inverter, where the system current is generated by the plurality of micro-inverter, wherein when comparing the system current value indicates the system current value is less than the lower threshold, a control signal drives the micro-inverter to switch from the off-state to the on-state; and wherein switching from the off-state to the on-state causes for each remaining power converter of the plurality of power converters operating in the off-state, a decreased probability of switching from the off-state to the on-state.

5. The system of claim 4, wherein generating the set current value further comprises comparing a measured DC voltage and a set point voltage value and generating a control error signal based on a difference between the measured DC voltage and the set point voltage value.

6. The system of claim 5, wherein the set point voltage value is based on a maximum power point (MPP) for the PV module.

7. The system of claim 4, wherein when the micro-inverter is in the off-state, a probability of switching from the off-state to the on-state increases as the input voltage increases.

8. The system of claim 4, wherein when the micro-inverter is in the on-state, a probability of switching from the on-state to the off-state increases as the input voltage to the micro-inverter decreases.

9. The system of claim 4, wherein when comparing the system current value indicates the system current value exceeds the upper threshold, the control signal drives the micro-inverter to switch from the on-state to the off-state; and wherein switching from the on-state to the off-state causes for each remaining micro-inverter of the plurality of micro-inverters operating in the on-state, a decreased probability of switching from the on-state to the off-state.

10. The system of claim 4, wherein the upper threshold is equal to the set current value added to a hysteresis value, the lower threshold is equal to the set current value minus the hysteresis value.

11. A method for operating a power converter of a plurality of serially connected power converters using chaotic democratic control comprising:
 measuring a DC voltage at an input of a power converter of the plurality of serially connected power converters;
 generating a set current value based on the measured DC voltage;
 measuring a system current value on a shared serial bus coupling the plurality of serially connected power converters, wherein the plurality of serially connected power converters generate the system current;
 generating an upper threshold and a lower threshold based on the set current value;
 comparing the system current value and the upper and lower thresholds to determine an operating state of the power converter; and
 generating at least one control signal for driving the power converter in the operating state, wherein when comparing the system current value indicates the system current value is less than the lower threshold, a control signal of the at least one control signal drives the power converter to switch from the off-state to the on-state; and wherein switching from the off-state to the on-state causes for each remaining power converter of the plurality, of power converters operating. in the off-state a decreased probability of switching from he off-state to the on-state.

12. The method of claim 11, wherein generating the set current value further comprises comparing the measured DC voltage and a set point voltage value and generating a control error signal based on a difference between the measured DC voltage and the set point voltage value.

13. The method of claim 12, wherein the set point voltage value is based on a maximum power point (MPP) for a DC source.

14. The method of claim 11, wherein when the power converter is in the off-state, a probability of switching form the off-state to the on-state increases as the input voltage to the power converter increases.

15. The method of claim 11, wherein when the power converter is in the on-state, a probability of switching from the on-state to the off-state increases as the input voltage to the power converter decreases.

16. The method of claim 11, wherein when comparing the system current value indicates the system current value exceeds the upper threshold, the control signal drives the power converter to switch from the on-state to the off-state; and wherein switching from the on-state to the off-state causes for each remaining power converter of the plurality of power converters operating in the on-state, a decreased probability of switching from the on-state to the off-state.

17. The method of claim 11, wherein the upper threshold is equal to the set current value added to a hysteresis value, and the lower threshold is equal to the set current value minus the hysteresis value.

* * * * *